(12) United States Patent
Kaddas (10) Patent No.: US 11,764,561 B2
(45) Date of Patent: Sep. 19, 2023

(54) ANTI-ROTATION CLAMP AND METHOD OF USE

(71) Applicant: Kaddas Enterprises Inc., Salt Lake City, UT (US)

(72) Inventor: James Kaddas, Salt Lake City, UT (US)

(73) Assignee: Kaddas Enerprises Inc., Salt Lake City, UT (US)

( * ) Notice: Subject to any disclaimer, the term of this patent is extended or adjusted under 35 U.S.C. 154(b) by 114 days.

(21) Appl. No.: 17/507,751

(22) Filed: Oct. 21, 2021

(65) Prior Publication Data

US 2023/0126863 A1  Apr. 27, 2023

(51) Int. Cl.
*H02G 7/05* (2006.01)

(52) U.S. Cl.
CPC .................... *H02G 7/053* (2013.01)

(58) Field of Classification Search
CPC ..................................................... H02G 7/053
USPC ...................... 248/63; 174/40 CC, 650, 168
See application file for complete search history.

(56) References Cited

U.S. PATENT DOCUMENTS

| | | | | |
|---|---|---|---|---|
| 6,087,593 A * | 7/2000 | Skipworth | ............. | H02G 11/00 174/136 |
| 6,201,184 B1 * | 3/2001 | Fran.cedilla.ois | ..... | H02G 7/053 174/41 |
| 11,532,931 B2 * | 12/2022 | Kao | ........................ | H01B 17/22 |
| 2014/0209502 A1 * | 7/2014 | Kaddas | .................... | H02G 7/00 53/467 |

FOREIGN PATENT DOCUMENTS

CN   205882199 U   1/2017
KR   200121875 B1  10/1998

* cited by examiner

*Primary Examiner* — Todd M Epps
(74) *Attorney, Agent, or Firm* — Bateman IP; Randall B. Bateman (57) ABSTRACT

An anti-rotation clamp and method of use may include a bolt having a threaded body along which a stabilizer moves relative to the threaded body, a stabilizer and an engagement member which engages the stabilizer to prevent relative rotation between the stabilizer and the engagement member as the threaded body is rotated.

20 Claims, 5 Drawing Sheets

ANTI-ROTATION CLAMP AND METHOD OF USE

BACKGROUND

Field of the Art

The present disclosure relates to an anti-rotation clamp and a method of use. In one or more embodiments, the anti-rotation clamp can be used with protective covers for power lines to protect wildlife from being electrocuted or otherwise damaging the power line.

State of the Art

In the conveyance of electricity over power lines, it is necessary to periodically support the power line and to connect lines for distribution to various locations. Each of these functions typically occurs on a power pole. The power pole is typically made of metal or wood and may include a cross member to which one or more insulator bushings are attached. A power line is attached to the insulator bushings in such a manner that the insulator bushing electrically isolates the power line from the pole. A connector is then used to by-pass the insulator to continue the flow of electricity along the power line.

While insulator bushings are effective at preventing the transfer of power from the power line to the power pole, the presence of the power line creates a potential hazard for various forms of wildlife. Birds, such as owls, hawks, osprey and eagles, and climbing animals, such as racoons and squirrels, often like to perch on the cross member or the top of a power pole because it provides good visibility of potential prey on the ground or a location to rest free from the threat of most ground predators.

If the animal touches the power line and causes it to ground, the animal will typically be electrocuted. It is estimated that each year electrical lines result in the electrocution of tens of thousands of animals, primarily large birds. State and Federal regulations can impose substantial penalties for the death of protected species. In 1999, the U.S. Department of Justice conducted the first criminal prosecution under the Migratory Bird Treaty Act and the Bald and Golden Eagle protection act.

In addition to the potential liabilities faced by power companies under species protection laws, the electrical charge which passes through the animal is so great that the animal may catch fire. If the animal falls to the ground, a brush fire or forest fire may be started. The risk to power companies of wildfires can be significant. California's Pacific Gas & Electric underwent bankruptcy due to the financial exposure created by wildfires caused by PG&E's power lines. Within two weeks of coming out of bankruptcy, the company was hit by another wave of lawsuits for subsequent wildfires. In the spring of 2021, prosecutors announced that they would be criminally prosecuting PG&E for a wildfire in which 84 people died.

In light of the civil and criminal exposure of power companies for wildfires and the death of wildlife, there has been a concerted effort to cover power lines in such a manner as to protect wildlife and reduce the risk of fires. Tens of thousands of protective covers has been placed on power lines adjacent power poles to keep wildlife from grounding the power line and electrocuting the wildlife.

One problem with some of the protective covers is that they have a tendency to rotate around the powerline during windstorms as they like. Many protective covers are placed over a power line and bushing and then a pin is inserted into holes in the protective cover. While this keeps the protective cover on the power line, it does little to prevent the rotation of the protective cover in a windstorm or when being climbed on by wildlife. If the cover rotates, the energized wire can be exposed—thereby leaving animals and the electrical system at risk.

Thus, there is a need for an apparatus and method for more securely holding protective covers to power lines.

SUMMARY OF THE INVENTION

The following summary of the present invention is not intended to describe each illustrated embodiment or every possible implementation of the invention, but rather to give illustrative examples of application of principles of the invention.

In accordance with one aspect of the present disclosure, one or more embodiments of an anti-rotation clamp may include an engagement member for engaging a power line, a stabilizer for engaging the protective cover, and a threaded body for moving the engagement member relative to the stabilizer.

In one or more embodiments, the threaded body may be part of a bracing bolt which may be engaged outside of the protective cover, with the engagement member being rotatably attached to the bracing bolt.

In one or more embodiments, the bracing bolt may be an eyebolt with an opening sized to receive a grasping mechanism from a hotstick used by those working on power lines.

In one or more embodiments, the stabilizer may rotate about the threaded body.

In one or more embodiments, the engagement member may have a plurality of arms which engage the stabilizer to prevent rotation of the engagement member as the threaded body is rotated.

In one or more applications, the anti-rotation clamp may be disposed in engagement with a protective cover so that the protective cover prevents rotation of the stabilizer and the threaded body rotated to advance the engagement member into engagement with a powerline so as to forcefully push the powerline and protective cover into engagement with one another.

It will be appreciated that the various aspects of the different embodiments may achieve different advantages within the context discussed herein and that the scope of the invention is delineated in the appended claims.

BRIEF DESCRIPTION OF THE DRAWINGS

Various embodiments of the present disclosure are shown and described in reference to the numbered drawings wherein.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "a bracket" may include an embodiment having one or more of such brackets, and reference to "the target plate" may include reference to one or more of such target plates.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed.

The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without necessarily being exactly that quality. For example, a structure said to be generally vertical would be at least as vertical as horizontal, i.e., would extend 45 degrees or greater from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Figure 1:
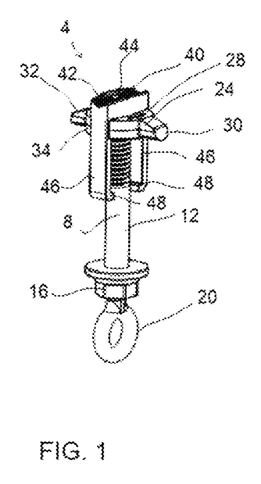
FIG. 1 illustrates a perspective view of an anti-rotation clamp in accordance with principles of the present disclosure.

Turning now to FIG. 1, there is shown a perspective view of an anti-rotation clamp, generally indicated at 4. The anti-rotation clamp 4 may include a bracing bolt 8 formed by a threaded body 12. The bracing bolt 8 may include a head 16, such as a conventional hexagonal head, and/or may have a head 20 which defines an opening so that the bracing bolt 8 forms an eyebolt. The head may be generally circular. The formation of the bracing bolt 8 as an eyebolt is advantageous because it facilitates the use of a hotstick. A hotstick is an insulated tool which allows electrical line workers to grasp various components while keeping the worker insulated from the power carried by the power line. The head 20 allows the hotstick to easily grasp and hold the bracing bolt 8 as it is being rotated either toward or away from a power line. Because the bracing bolt 8 may be used on power lines, it is preferred that the bracing bolt be formed from a nonconductive material, such as a polymer.

Disposed along the bracing bolt 8 is a stabilizer 24. The stabilizer 24 may include a central portion 28 which is threaded to engage the threads of the bracing bolt 8 such that rotation of the bolt in one direction will cause movement of the stabilizer 24 toward one end of the bracing bolt, and rotation in the opposite direction will cause movement of the stabilizer toward the opposing end of the bolt.

The stabilizer 24 may also include a first arm portion 30 and a second arm portion 32 extending outwardly from the central portion 28. As will be discussed in the detail below, the first arm portion 30 and second arm portion 32 may be used configured to engage a protective cover (FIG. 8) to help secure the protective cover on a power line. The stabilizer 24 may also include one or more slots or channels 34 which will be discussed in additional detail below.

Also disposed on the bracing bolt 8 is an engagement member 40 which includes an engagement body 42 with an engagement surface 44, such as a cradle or other concave surface, configured to forcibly engage a power line. The engagement member 40 may also include one or more arms 46 which may slide in the slots 34 on the stabilizer 24. Disposed at an end of the arms 46 opposite the engagement surface 44 may be one or more stops 48 which prevent the stabilizer 24 from moving beyond the arms 46.

In one representative embodiment, the stabilizer 24 may be between 2 and 4 inches wide from the outside edge of the first arm 30 to the outside edge of the second arm 32 and with the central portion 28 having a diameter between 0.75 and 1.5 inches. In one preferred embodiment, the distance between the outside edge of the first arm 30 in the outside edge of the second arm 32 is between 2.25 inches and 2.75 inches, with the central portion having a diameter between 0.75 and 1 inches. In a presently preferred embodiment, the distance between the outside edges of the first and second arms 30, 32 is about 2.6 inches.

In one representative embodiment, the height of the engagement member 40 may be between 2 and 4 inches. In a more preferred embodiment, the length of the engagement member from the top of the engagement body 42 to the bottom of the arms 46 is between 2.5 and 2.7 inches.

Figure 2:
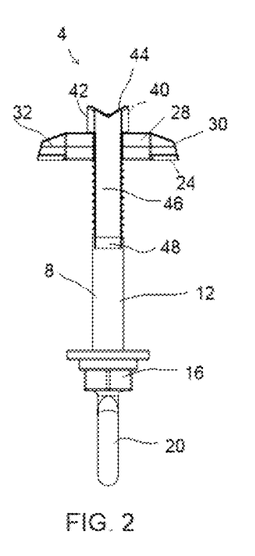
FIG. 2 illustrates a side view of an anti-rotation clamp in a first, attachment position.
Figure 3:
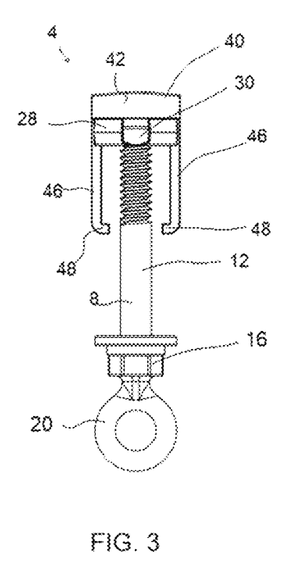
FIG. 3 shows a side view of the anti-rotation clamp of FIG. 2 rotated 90° about its long axis.

Turning now to FIGS. 2 and 3, there are shown two side views of the anti-rotation clamp 4, FIG. 3 showing the image of FIG. 2 rotated about its longitudinal axis 90 degrees. The stabilizer 24 is disposed in a first, attachment position where in the stabilizer is at the top of the threaded portion of the bracing bolt 8 on an end opposite the head 16 and/or 20 and adjacent to the engagement body 42. This is a configuration of the anti-rotation 4 in which it will typically be mounted in the protective cover as discussed below.

Figure 4:
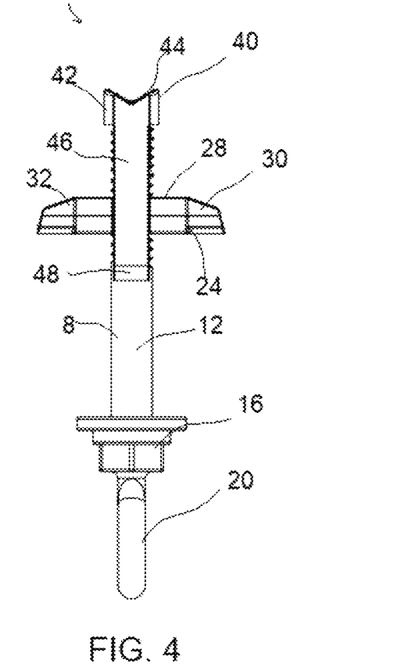
FIG. 4 illustrates a side view of the anti-rotation clamp in a second, clamping position.
Figure 5:
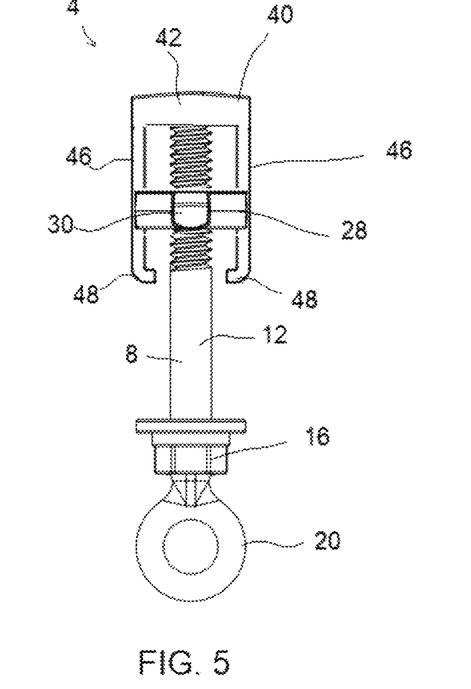
FIG. 5 shows a side view of the anti-rotation clamp of FIG. 4 rotated 90° about its long axis.

FIGS. 4 and 5 show side views of the anti-rotation clamp 4 in a second, the clamping position. FIG. 5 shows the anti-rotation clamp 4 of FIG. 4 rotated to the left 90° about its longitudinal axis. By rotation of the head 16 and/or 20 of the bracing bolt 8 in a clockwise direction, the stabilizer 24 is forced to move down the bracing bolt by an interaction with threads of the central portion 28 of the stabilizer with the threads on threaded body 12. The distance along which the threaded body 12 and the stabilizer 24 may move may be regulated by the length of the threaded portion of the bracing bolt, by the stops 48 at the end of the arms 46 of the engagement member 40, or a combination of two. (While discussed as the threads moving the stabilizer downwardly when rotated clockwise, it will be appreciated that the orientation of the threads could be reversed so that counterclockwise causes a similar reaction).

Figure 8:
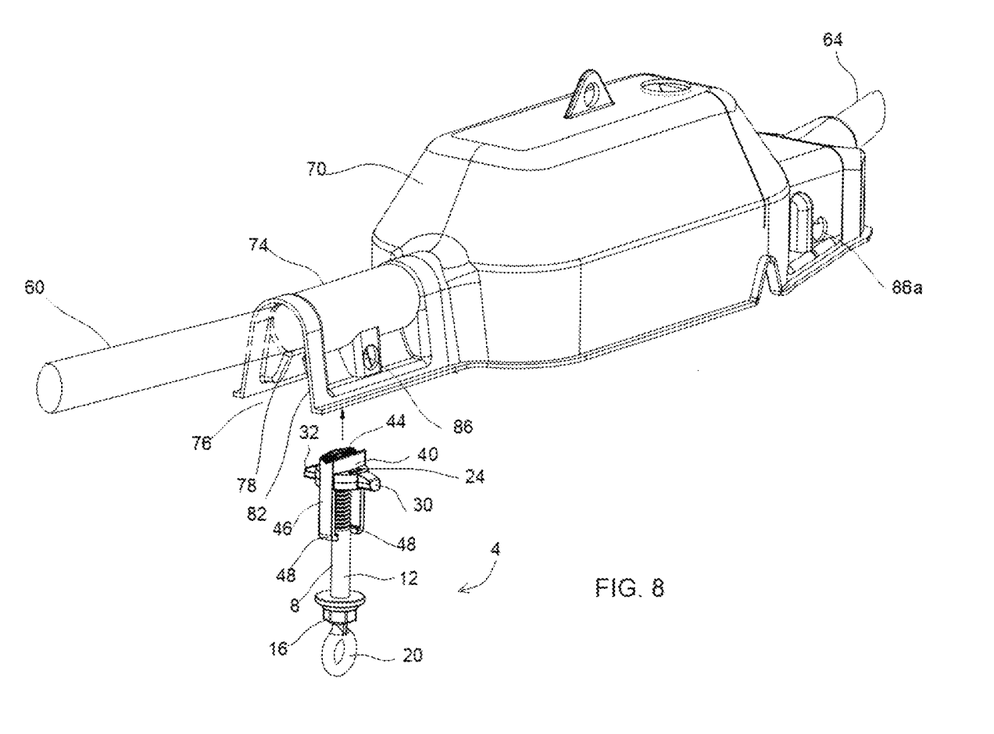
FIG. 8 shows a perspective view of an anti-rotation clamp being mounted to a protective cover disposed on a powerline.

It will be appreciated that the anti-rotation clamp 4 will typically be inserted so that the arms 30 and 32 of the stabilizer 24 engage a protective cover (FIG. 8). This may be by extending through holes in the protective cover or into recesses which secure the stabilizer 24 in engagement with the protective housing. As the bracing bolt 8 is rotated, the stabilizer 24 remains generally static relative to the protective housing and the bracing bolt and the engagement member 40 disposed on the end of the bolt advance into the protective cover until the engagement member securely engages a power line and presses it against an inner structure of the protective cover.

Figure 6:
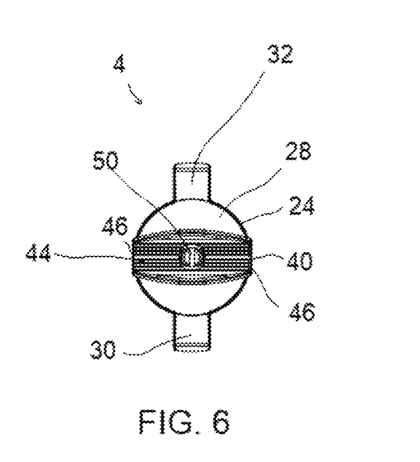
FIG. 6 shows a top view of the anti-rotation clamp.

Turning now to FIG. 6, there is shown a top view of the anti-rotation clamp 4. It will be appreciated that the engagement member 40 may have a length which is configured to extend along the length of the power cable, while a length of the stabilizer 24 (i.e., the orientation extending from the far edge of the first arm 30 to the far edge of the second arm 32) is generally perpendicular to that of the engagement member. The arms 46 of the engagement member 40 engage the slots 34 (FIG. 7) in the central portion 28 of the stabilizer 24 so that the engagement member and the stabilizer remain generally perpendicular to one another and do not rotate relative to one another as the bracing bolt 8 is rotated in either direction.

Figure 7:
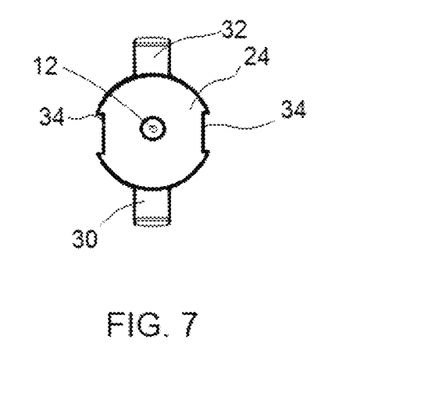
FIG. 7 shows a top view of the anti-rotation clamp with the engagement member removed.

Also shown in FIG. 6 is a fastener 50, such as a screw or rivet which holds the engagement member 40 onto the bracing bolt 8 while allowing the engagement member and bracing bolt to rotate relative to one another. FIG. 7 shows a top view of the stabilizer 24 and bolt 12 with the engagement member 40 removed so as to make the slots 34 in the central portion 28 of the stabilizer visible. The slotted movement between the arms 46 of the engagement member 40 in the slots 34 of the stabilizer 24 allows the stabilizer to remain properly aligned with the holes or receptacles in protective cover while the engagement surface 44 of the engagement member remains in alignment with the power line passing through the protective cover.

FIG. 8 shows a fragmented view of a power line 60 having a protective cover 70 disposed thereon. A second portion 64 of a power line may also be seen. Such a protective cover 70 is often used to cover various utility hardware and a distance of power line on either side to prevent birds and other animals from completing the circuit and getting electrocuted. In many protective covers 70, a power line engagement portion 74 includes a housing with an open bottom 76 and sloped walls 82 which lead into a generally cylindrical holding area 78 for receiving the line. To hold the protective cover 70 in place, a non-conducting pin may be inserted into holes 86 in the housing, thereby preventing the protective cover from being removed. While such placement holds the protective cover on the power line, wind or animals standing on the protective cover may cause the protective cover to rotate about the power line—thereby exposing the power line in a manner which increases the risk of electrocution to a bird, etc.

The anti-rotation clamp 4 of the present disclosure substantially reduces the likelihood of this happening. Instead of inserting a pin into the holes 86, the stabilizer 24 of the anti-rotation clamp 4 can be inserted to the first arm 30 extends out the hole in one side the second arm 32 sticks out a hole (not visible) in the other side. The head 16 or head 20 can then be grasped and rotated. The sidewalls defining the holes 86 prevent the stabilizer 24 from rotating as the bracing bolt 8 is turned. The arms 46 of the engagement member 40, in turn, prevent the engagement member 40 from rotating, thereby keeping the length of the engagement member aligned with the length of the power line 60. As the anti-rotation clamp 4 moves from the first, attachment position shown in FIGS. 1, 2, 3 and 8 into the second, engagement position shown in FIGS. 4 and 5, the engagement member 40 contacts and pushes upwardly on the power line 60 and the stabilizer 24 pulls downwardly on the protective cover 70 until the powerline is clamped between the engagement member and the protective cover. This clamped engagement reduces the risk that the protective cover will rotate either due to high winds or the weight of an animal standing on the protective cover. Depending on the risk, a single anti-rotation clamp 4 can be used for each protective cover, or multiple anti-rotation clamps may be used, such as by putting one in hole 86a near the other end of the protective cover.

Figure 9:
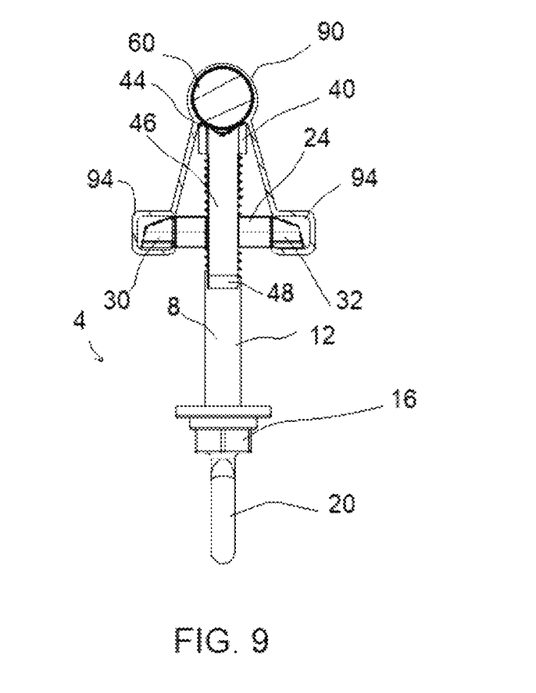
FIG. 9 shows a side view of an anti-rotation clamp mounted in an alternate protective cover.

FIG. 9 shows an anti-rotation clamp 4 disposed in another protective cover 90. Rather than extending through holes in the cover 90, the arms 30, 32 of the stabilizer 24 extend into recesses 94 formed in the cover which prevent rotation of the stabilizer 28 while the bracing bolt 8 is being rotated. As shown in FIG. 9, the engagement surface 44 of the engagement member 40 has engaged the power line 60 and is forming the power line and the protective cover 90 into engagement with one another, to thereby inhibit rotation of the protective cover about the power line.

Figure 10:
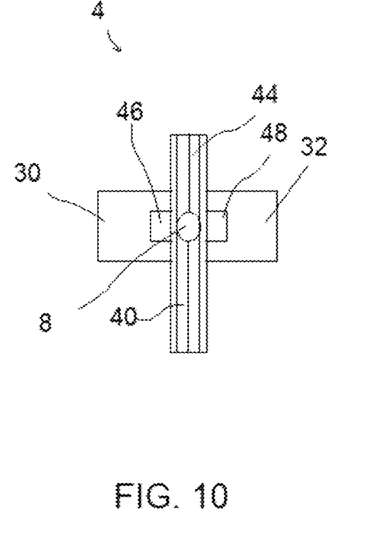
FIG. 10 shows a top view of an anti-rotation clamp.
Figure 11:
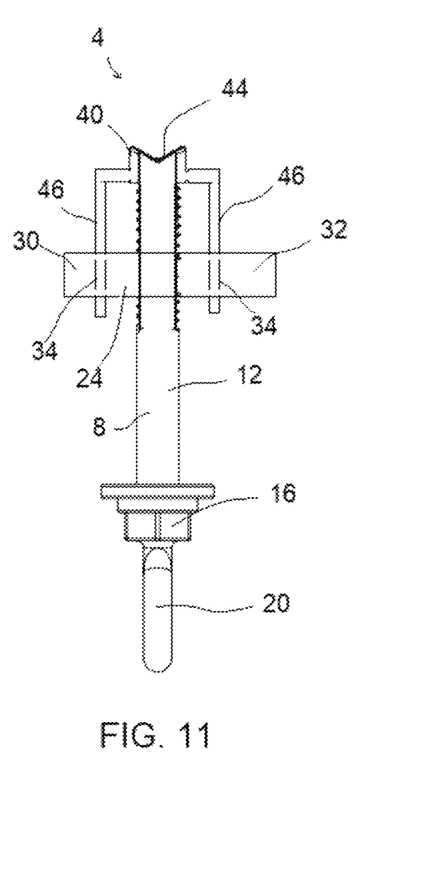
FIG. 11 shows a side view of the anti-rotation clamp of FIG. 10.

FIGS. 10 and 11 show a top view and a side view, respectively, of an alternate configuration of an anti-rotation clamp 4. The anti-rotation clamp 4 may include a bracing bolt 8 having a threaded body 12 with a head, such as a hex head 16 and/or eyebolt head 20. A stabilizer 24 is disposed in threaded engagement with the threaded body 12 so that the rotating of the bracing bolt 8 moves the stabilizer.

Also shown is an engagement member 40 with an engagement surface 44 for engaging a power line or the like, and one or more arms 46 for engaging the stabilizer 24 to prevent the stabilizer and engagement member from rotating with respect to each other.

Thus, there is disclosed an anti-rotation clamp and a method of use. Those skilled in the art will appreciate that numerous modifications can be made without departing from the scope and spirit of the invention. The appended claims are intended to cover such modifications.

What is claimed is:

1. An anti-rotation clamp comprising:
   a threaded body;
   a stabilizer disposed on the threaded body such that rotation of the threaded body moves the stabilizer along the threaded body; and
   an engagement member disposed in communication with the stabilizer, the engagement member comprising at least one arm for engaging the stabilizer for preventing the engagement member from rotating relative to the stabilizer.

2. The anti-rotation clamp of claim 1, wherein the stabilizer comprises at least one slot and wherein the at least one arm of the engagement member slides within the at least one slot of the stabilizer.

3. The anti-rotation clamp of claim 1, wherein the at least one arm of the engagement member comprises a first arm and a second arm, and wherein the at least one slot of the stabilizer comprises a first slot and a second slot disposed generally opposite of one another and wherein the first arm of the engagement member slides in the first slot of the stabilizer and wherein the second arm of the engagement member slides within the second slot of the stabilizer.

4. The anti-rotation clamp of claim 1, further comprising a stop formed on the at least one arm of the engagement member.

5. The anti-rotation clamp of claim 1, wherein the engagement member has a length and the stabilizer has a length and wherein the length of the engagement member is perpendicular to the length of the stabilizer.

6. The anti-rotation clamp of claim 1, wherein the engagement member comprises a concave engagement surface.

7. The anti-rotation clamp of claim 1, wherein the engagement member is attached to the threaded body.

8. The anti-rotation clamp of claim 1, wherein the engagement member is attached to the threaded body of the eyebolt with a fastener.

9. A system for preventing rotation of a protective cover on a power line comprising the anti-rotation clamp of claim 1, further comprising a protective cover, the protective cover being disposed on a power line, and wherein the stabilizer engages the protective cover and wherein the engagement member engages the power line.

10. The system according to claim 9, wherein the protective cover has holes formed therein and wherein the stabilizer extends through the holes in the protective cover.

11. The system according to claim 9, wherein the protective cover has recesses formed therein and wherein the stabilizer extends into the recesses.

12. The system according to claim 9, wherein the engagement member has a length which is disposed generally parallel to a length of the power line, and wherein the at least one arm of the engagement member comprises a first arm extending downwardly from the engagement member at one end of the length of the engagement member and wherein the at least one arm of the engagement member comprises a second arm extending generally downwardly from an opposing end of the length of the engagement member.

13. The system according to claim 12, further comprising a stop disposed at least one of the first arm and the second arm.

14. The system according to claim 9, wherein the stabilizer comprises a central portion and a first arm extending away from the central portion and a second arm extending away from the central portion.

15. A method of attaching a protective cover onto a power line, the method comprising:

selecting a cover having a void for holding a power line and at least one recess or hole formed in the cover;

selecting an anti-rotation clamp having a stabilizer, an engagement member and a threaded body;

inserting the stabilizer into the at least one recess or hole formed in the cover; and rotating the threaded body to cause the engagement member to engage the power line and press the power line into engagement with the cover.

16. The method according to claim 15, wherein the cover has a first hole and a second hole and wherein the stabilizer includes a first arm and a second arm, and wherein the method comprises placing the first arm of the stabilizer in one of the first hole and the second hole and the second arm of the stabilizer in another of the first hole and the second hole and rotating the threaded body to move the engagement member.

17. The method according to claim 16, wherein the engagement member comprises at least one arm extending into engagement with the stabilizer and the method includes rotating the threaded body without rotating the engagement member relative to the stabilizer.

18. The method according to claim 17, wherein the engagement member has a concave engagement surface extending along a length of the engagement member and wherein the method comprising advancing the engagement member into contact with the power line while maintaining the concave engagement surface generally parallel to the power line.

19. The method according to claim 18, wherein the threaded body has a generally circular head having a void disposed therein and wherein the method comprises rotating the generally circular head by use of a hotstick.

20. An anti-rotation clamp comprising:

an eyebolt having a threaded body;

a threaded stabilizer disposed along the threaded body of the eyebolt so that the threaded stabilizer moves along the threaded body, the threaded stabilizer having a first slot and a second slot; and an engagement member disposed at one end of the threaded body of the eyebolt, the engagement member having a first arm and a second arm and wherein the first arm and the second arm are slidably disposed in the first slot and the second slot.

* * * * *